United States Patent [19]

Lambert

[11] Patent Number: 4,540,203
[45] Date of Patent: Sep. 10, 1985

[54] ROLLING CUFF FLEXIBLE BELLOWS

[75] Inventor: Donald R. Lambert, Livermore, Calif.

[73] Assignee: The United States of America as represented by the United States Department of Energy, Washington, D.C.

[21] Appl. No.: 425,139

[22] Filed: Sep. 27, 1982

[51] Int. Cl.³ .................... F16L 27/10; F16L 51/02
[52] U.S. Cl. .................................. 285/226; 285/229
[58] Field of Search ............... 285/226, 229, 227, 228, 285/299, 300, 301

[56] References Cited

U.S. PATENT DOCUMENTS

| | | | |
|---|---|---|---|
| 1,835,010 | 12/1931 | Burnish | 285/300 |
| 2,096,066 | 10/1937 | Saforcada | 285/229 X |
| 2,352,038 | 6/1944 | Tolke | 285/229 |
| 2,418,800 | 4/1947 | Wilson | 285/226 |
| 2,481,472 | 9/1949 | Culp | 285/226 X |
| 2,657,074 | 10/1953 | Schwester et al. | |
| 2,920,656 | 1/1960 | Bertolet, Jr. | |
| 3,106,414 | 10/1963 | Peters | |
| 3,127,200 | 3/1964 | Sayag | |
| 3,184,917 | 5/1965 | Caovette | |
| 3,633,945 | 1/1972 | Press et al. | |
| 4,159,133 | 6/1979 | Belanger | 285/229 X |

FOREIGN PATENT DOCUMENTS

| | | | |
|---|---|---|---|
| 694163 | 8/1940 | Fed. Rep. of Germany | 285/226 |
| 191911 | 12/1937 | Switzerland | 285/229 |

Primary Examiner—Thomas F. Callaghan
Attorney, Agent, or Firm—L. E. Carnahan; Roger S. Gaither; Judson R. Hightower

[57] ABSTRACT

A flexible connector apparatus used to join two stiff non-deformable members, such as piping. The apparatus is provided with one or more flexible sections or assemblies each utilizing a bellows of a rolling cuff type connected between two ridge members, with the bellows being supported by a back-up ring, such that only the curved end sections of the bellows are unsupported. Thus, the bellows can be considered as being of a tube-shaped configuration and thus have high pressure resistance. The components of the flexible apparatus are sealed or welded one to another such that it is fluid tight.

20 Claims, 10 Drawing Figures

ROLLING CUFF FLEXIBLE BELLOWS

BACKGROUND OF THE INVENTION

The invention described herein arose at the Lawrence Livermore National Laboratory in the course of, or under, Contract No. W-7405-ENG-48 between the United States Department of Energy and the University of California.

This invention relates generally to flexible apparatus for connecting rigid members, particularly to flexible apparatus utilizing bellows, and more particularly to a flexible bellows assembly utilizing a rolling cuff.

In various applications it is necessary to provide for expansion, contraction, or flexing of rigid components and numerous approaches have been developed for these purposes. For example, in piping systems, it is sometimes necessary to provide flexibility to allow for deformation with the piping system. Deformation of the piping system can result from such phenomena as heat loads and stress loads. The oil and gas industries, for example, have developed various apparatus to allow for such deformation of piping systems.

It is common in steam piping systems to provide deformable or flexible connectors, such as expansion bellows, at periodic intervals to join rigid pipe sections together. As steam is routed through the pipes, the heat of the steam will cause the pipes to expand; this expansion is absorbed in the deformable or flexible connectors, thereby preventing rupture of the piping system.

Also, seismic activity can place stresses of significant magnitude on piping systems to cause the piping to rupture. To address this problem in such structures as nuclear power plants, piping systems, such as the emergency core cooling system, must be fitted with massive expansion joints and shock absorbers.

Additionally, oil transporting systems located underwater where the external pressure is greater than that within are subjected to substantial load and stress due to the temperature and pressure of the water, as well as seismic activity or motion, such as caused by tidal waves. Thus, couplings of flexible or expandable types are required to prevent oil spills due to failure of the transporting system.

One prior approach to resolving the deformation of oil pumping and transport systems is to provide weld-end expansion ball joints with metal seals and sealant compatable with the high pressure and temperature of such systems. These expansion ball joints are exemplified by *Design News*, pp. 84–85, Apr. 5, 1982 in an article by E. J. Stefanides entitled "Graphite Material Seals Ball Joints".

Various types of expansion and/or seal approaches have been developed which utilize different types of bellows arrangements. These prior known bellows arrangements are exemplified by U.S. Pat. No. 2,657,074 issued Oct. 27, 1953 to D. P. Schwester et al; No. 2,920,656 issued Jan. 12, 1960 to E. C. Bertolet, Jr.; No. 3,106,414 issued Oct. 8, 1963 to M. F. Peters; No. 3,127,200 issued Mar. 31, 1964 to A. Sayag; No. 3,184,917 issued May 25, 1965 to Z. A. Caouette et al, and No. 3,633,945 issued Jan. 11, 1972 to I. D. Press et al.

The various prior known expansion and bellows arrangements have advanced the state of the art and have resolved numerous deformation problems in piping and other systems. The prior known bellows systems, when placed under high pressure, high temperature expansion, or high stress load conditions caused by movement, deform beyond the elastic limit of the materials of which they are made and thus either rupture or must be replaced. Thus, there has been a long felt need for a less massive and less costly bellows arrangement that can withstand high heat and/or stress loads, and which is capable of being used in various environments.

SUMMARY OF THE INVENTION

The present invention provides a connector apparatus utilizing a flexible bellows which fills the above need and can withstand substantial pressures from within or from without as well as being responsive to deflection of rigid members, such as piping, to which the bellows is connected.

Therefore, it is the object of this invention to provide an improved connector apparatus utilizing flexible bellows.

A further object of the invention is to provide a bellows arrangement which can be utilized under high pressure and deflection conditions, as well as in various environments.

A still further object of the invention is to provide a bellows of a rolling cuff type wherein only the curved ends of the flexible member are unsupported, thus preventing deformation beyond the elastic limit of the material thereof.

Another object of the invention is to provide a flexible connector apparatus for joining two non-deformable members and provided with a plurality of series-connected bellows assemblies of a rolling cuff type capable of withstanding high internal or external pressures and deflections.

Other objects of the invention will become apparent from the following description and accompanying drawings.

The above objects and advantages of the present invention are carried out by providing a flexible connector apparatus containing one or more bellows of rolling cuff type secured between two stiff non-deformable members, such as pipe sections in a piping system.

The rolling cuff bellows of this invention utilizes a open-end, elongated, curved and flexible member or element, defining a torus-shaped cross-section, wherein each of the open ends are secured to a rigid element and the elongated section is supported by a backup member, such that only the curved sections are unsupported. Thus, fluid under pressure entering the flexible bellows member from within the flexible apparatus, or from external sources caused deflection of the member but is not sufficient to deform the member beyond its elastic limit.

The flexible member or rolling cuff bellows of this invention may be made from materials, such as metal, to withstand high pressure or temperature conditions, or be made from materials, such as plastics, nylon, etc., for use in corrosive environments.

Depending on the applicaton, the flexible member or rolling cuff bellows can be utilized in a singular or series connected arrangement, with the opening of the member being located internally or externally.

DETAILED DESCRIPTION OF THE INVENTION

The present invention is directed to a flexible connector apparatus which utilizes one or more rolling cuff type bellows which provides flexibility under high pressure and temperature conditions while being capable of operation in various types of environmental conditions. The invention is a compact, low cost bellows type connector apparatus which provides a flexible connector between two non-deformable members, such as pipe sections. The invention basically comprises a flexible connector apparatus composed of: (1) at least one open ended, elongated, deformable, curved element, (2) a pair of rigid elements fixedly secured to the open ends of said deformable element, and (3) a back-up or support member positioned around said deformable element such that only the curved sections of said deformable element are unsupported, said pair of rigid elements being connected directly to or through an attachment member to a pair of pipes or members requiring flexible connection.

Figure 1:
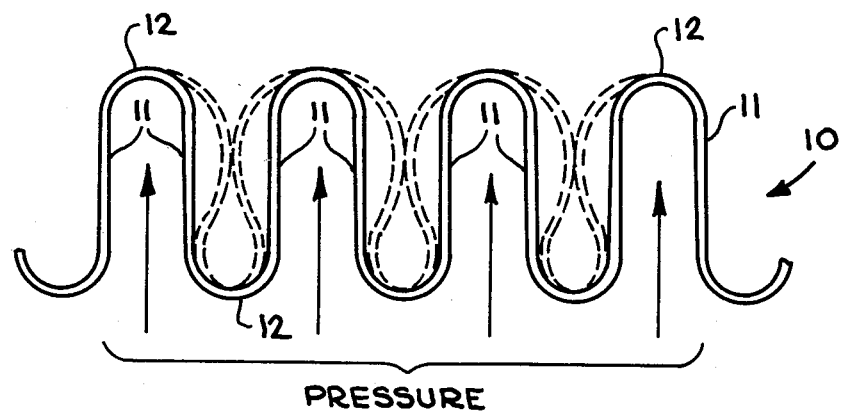
FIG. 1 illustrates the operation of the prior art bellows when placed under high fluid pressure.
Figure 2:
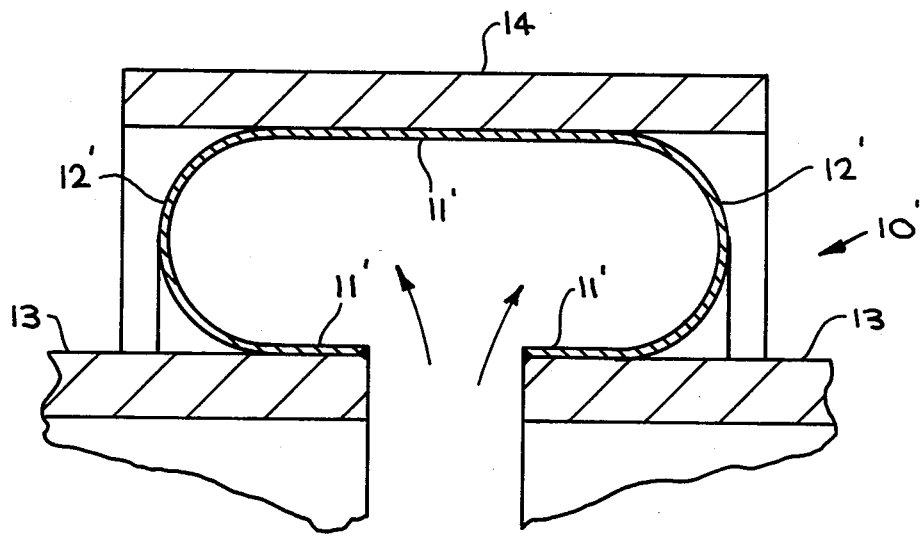
FIG. 2 illustrates the operation of a rolling cuff bellows of this invention when placed under fluid pressure.

The operation of the rolling cuff bellows arrangement of the present invention differs from that of the prior known bellows, as illustrated by a comparison of FIG. 1 with FIG. 2.

In the prior bellows, as shown in FIG. 1, wherein the solid lines indicate a flexible element 10, having a series of flat sections 11 and curved sections 12, in a low pressure or neutral mode. As the pressure indicated by arrows and legend, is increased the flat or straight sections 11 of the element deform to the position shown in broken lines. At this point of deformation, the element is beyond its elastic limit and will not return to its original (solid line) position, and therefore becomes ineffective for its intended use. For a flexible element of a thin material, this deformation beyond the elastic limit would result from the application of only several hundred pounds pressure. Thicker material only helps slightly and make the bellows very stiff and difficult to make.

In the rolling cuff bellows of this invention, which has a torus-shaped cross-section, all of the flat sections 11' of the flexible element or rolling cuff' are supported. The two open end flat sections 11' are secured, as by welding, to a pair of rigid members 13, while the flat center section 11' (opposite the open end sections) is in physical contact with and supported by a back-up member 14, but not fixedly secured thereto. Only the curved sections 12' of the element are unsupported. Thus, as the pressure, indicated by arrows, is directed into the interior of the flexible element 10 only the curved sections 12' deform, and such curved sections can withstand significantly higher pressures before reaching the elastic limits thereof than can unsupported flat sections of the prior known bellows. The flexible element or rolling cuff 10', as constructed in FIG. 2, can be considered as having a tubular shape which shape is known to withstand substantially high pressures compared to a flexible element having flat surface areas, as in FIG. 1. As the pressure is applied to the flexible element of FIG. 2, the element expands or contracts, as described in greater detail hereinafter.

Figure 3:
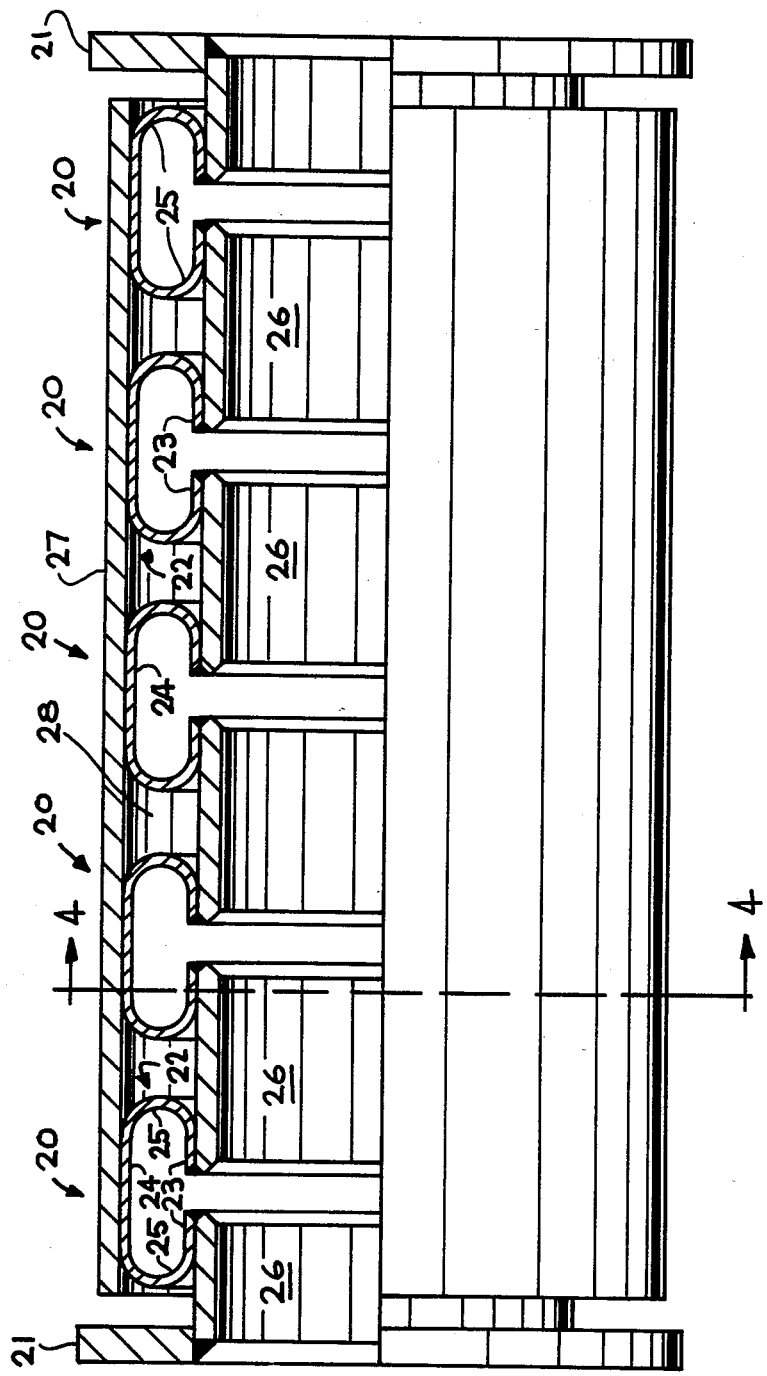
FIG. 3 is a view, partially in cross-section, of an embodiment of a flexible connector apparatus made in accordance with the present invention, and utilizing a series of rolling cuff bellows.
Figure 4:
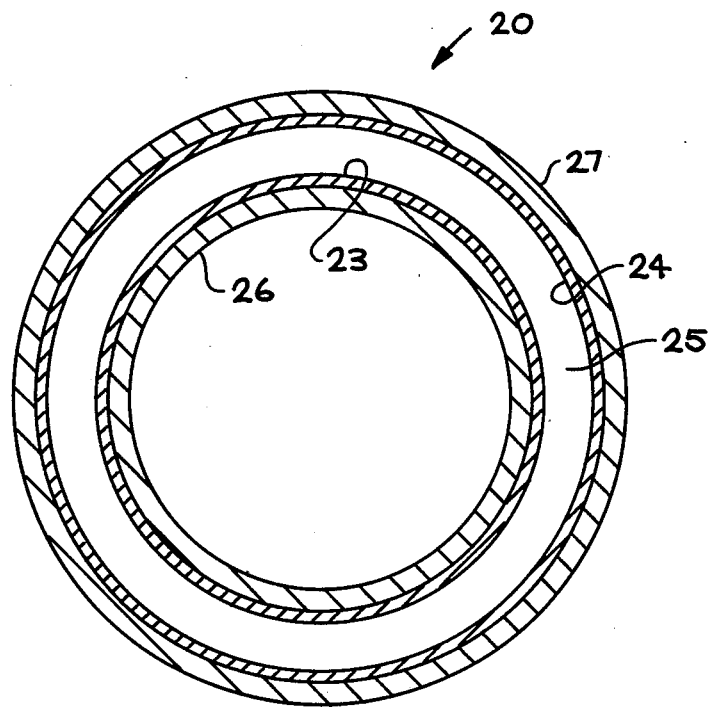
FIG. 4 is a cross-sectional view taken along the lines 4—4 of FIG. 3.

Referring now to FIGS. 3 and 4 which illustrate an embodiment of the flexible connector assembly wherein a plurality of rolling cuff bellow assemblies are mounted in a series relation. This embodiment is restricted substantially to axial movement only (versus axial and radial movement) and would not be used in applications with a large number of duty cycles but rather in applications such as for earthquake protection. In this embodiment, each of the central flat sections of the rolling cuff bellows elements are supported by the same outer sleeve or back-up member and the friction loads on each element would vary as the internal pressure of the system.

The embodiment shown in FIGS. 3 and 4 comprises a plurality of flexible connectors or rolling cuff bellows assemblies of an annular configuration, generally indicated at 20, arranged and connected in series between a pair of connecting flanges or members 21 each adapted to be connected to a pipe section, for example. As in the FIG. 2 illustration of the rolling cuff bellows, each of the assemblies 20 comprises a flexible annular element or rolling cuff 22, which has an open-ended elongated, curved cross section, defining a torus-shape configuration, consisting of a pair of spaced flat end sections 23, and a flat central or body section 24 connected to end sections 23 by curved sections 25. The flat end sections 23 are secured, as by welding, bonding, etc., to a plurality of spaced inner rigid annular members 26, such that the end sections of one flexible element 22 is secured to a pair of adjacent annular members 26. The two annular members 26 of the two end assemblies are secured, as by welding, bonding etc., to connecting flanges 21. The flat central or body section 24 of each of the flexible elements 22 is physically supported by, but not fixedly secured to, an outer annular back-up member or sleeve 27. As can be seen in FIG. 4 inner rigged members 26 and outer back-up member 27 are each of a circular or annular cross-section and are concentric so as to form a space 28 therebetween within which the flexible elements 22 are located. The back-up member or sleeve 27 is formed so as to slide over the flexible elements 22 in a close, slip fit and is locked in place by any expansion of the flexible elements.

With the components of the bellows assemblies 20 of the FIG. 3 embodiment joined together as described above, the flexible connector apparatus formed thereby is completely sealed so that any fluid contained within the bellows assemblies 20, or passing through the connector apparatus, cannot escape, nor can fluid from the outside enter into the connector or bellows assemblies 20.

By way of example, should the five (5) flexible connector assemblies 20 be constructed such that the space between annular members 26, and thus the space between flat end sections 23 of flexible element 22, is 0.25 inch, on compression the five connector assemblies may allow for total movement of up to 1.25 inch of the flange or connector members 21 with respect to each other.

The bellows assemblies 20 can be made from a variety of different materials, depending on the application for which the flexible connector apparatus is to be used. For applications having high internal or external pressures or temperatures, the flexible elements 22 and/or members 26 and 27 can be made of pure metal or alloys, such as stainless steel, carbon steel and aluminum. For applications in corrosive environments, the flexible elements and members 26 and 27, if desired or required, may be constructed from various types of plastics, nylon, polyethylene and fluorocarbon, for example. Plastic components for the bellows assemblies could be injection molded and glued or heat welded, as known in the art.

While the FIG. 3 embodiment illustrates five (5) bellows assemblies 20 positioned in series, it is readily seen that any number of bellows assemblies, from one on up can be utilized, depending on the application for the flexible connector apparatus in which they are mounted. Also, while not shown the flange 21 may be provided with openings thereabout for attachment to an associated pipe section.

Figures 5A, 5B, 5C:
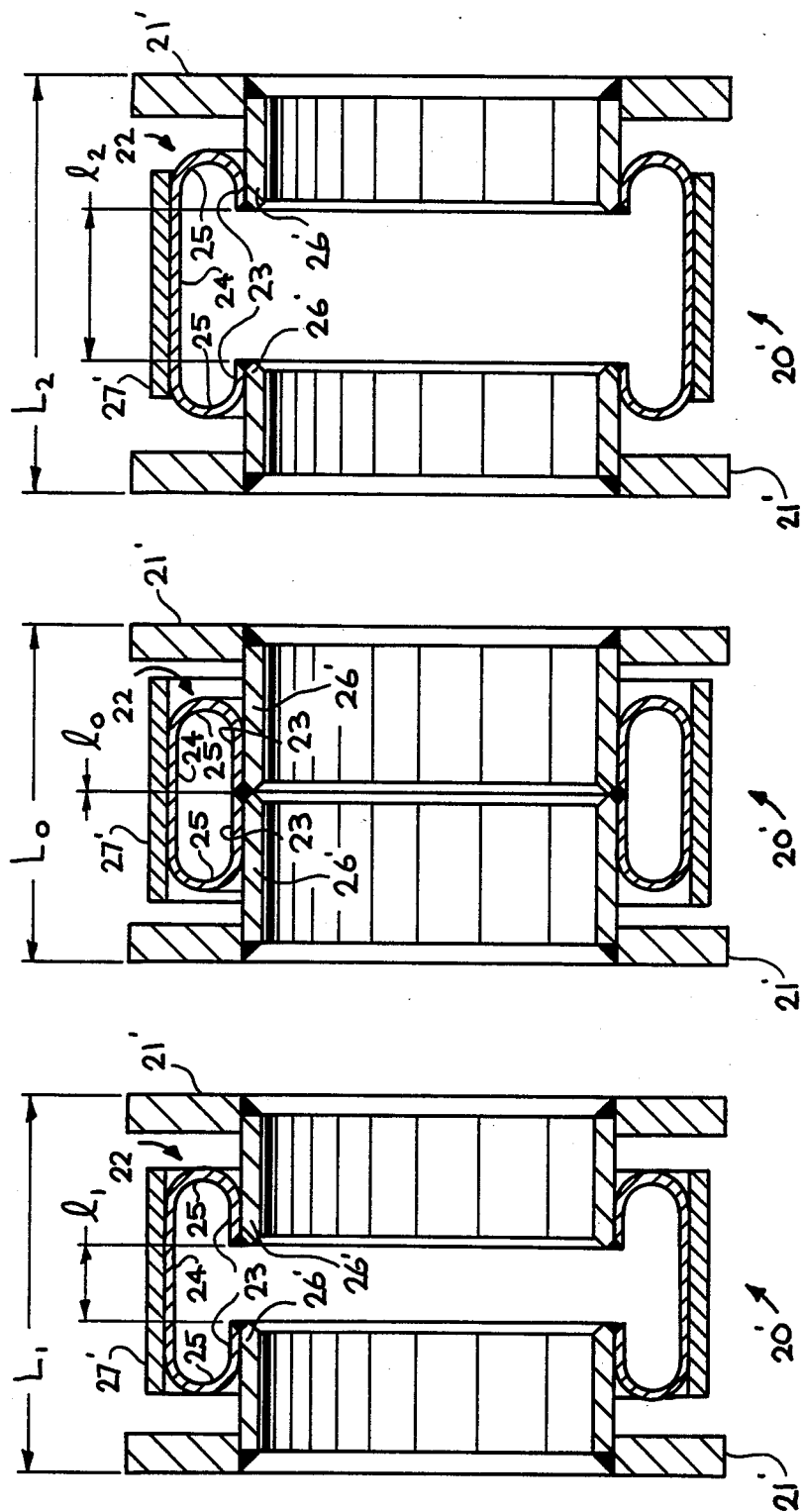
FIG. 5a–5c illustrate a single flexible connector or bellows assembly utilizing the rolling cuff of the present invention in its neutral, contracted, and extended positions.

FIGS. 5a–5c illustrate a single flexible or bellows connector assembly utilizing the rolling cuff or torus shaped bellows element in an operational sequence of neutral, contracted, and expanded positions. For purpose of illustration, similar reference numerals to the components of the FIG. 3 embodiment are given. In FIG. 5a, the flexible connector assembly 20' is in the neutral position with the flanges or connector members 21' positioned apart by a distance $L_1$ and the flat end sections 23 of rolling cuff or flexible element 22 are spaced by a distance 1.

Should the apparatus to which the flanges 21' are connected be moved by some compressive force such that the distance between the flanges 21' as shown in FIG. 5b is reduced to a distance $L_o$, the element 22 contracts and the space between the flat end sections 23 of element 22 is reduced to a distance $l_o$, the amount depending on the contraction force applied. Note that the curved sections 25 of element 22 change location (move inwardly) within back-up sleeve 27'.

As shown in FIG. 5c, should an expansive force be applied to the flexible connector assembly 20', the distance between the flanges 21' is increased to $L_2$ and, correspondingly, the distance between flat end sections 23 of rolling cuff or flexible element 22 is increased to $l_2$, allowing for expansion of the assembly 20' while maintaining its general configuration whereby only the curved sections 25 of the element are unsupported. Note that the curved sections 25 change location (move outwardly) within back-up sleeve 27', as the connector assembly 20' expansions.

Figure 6:
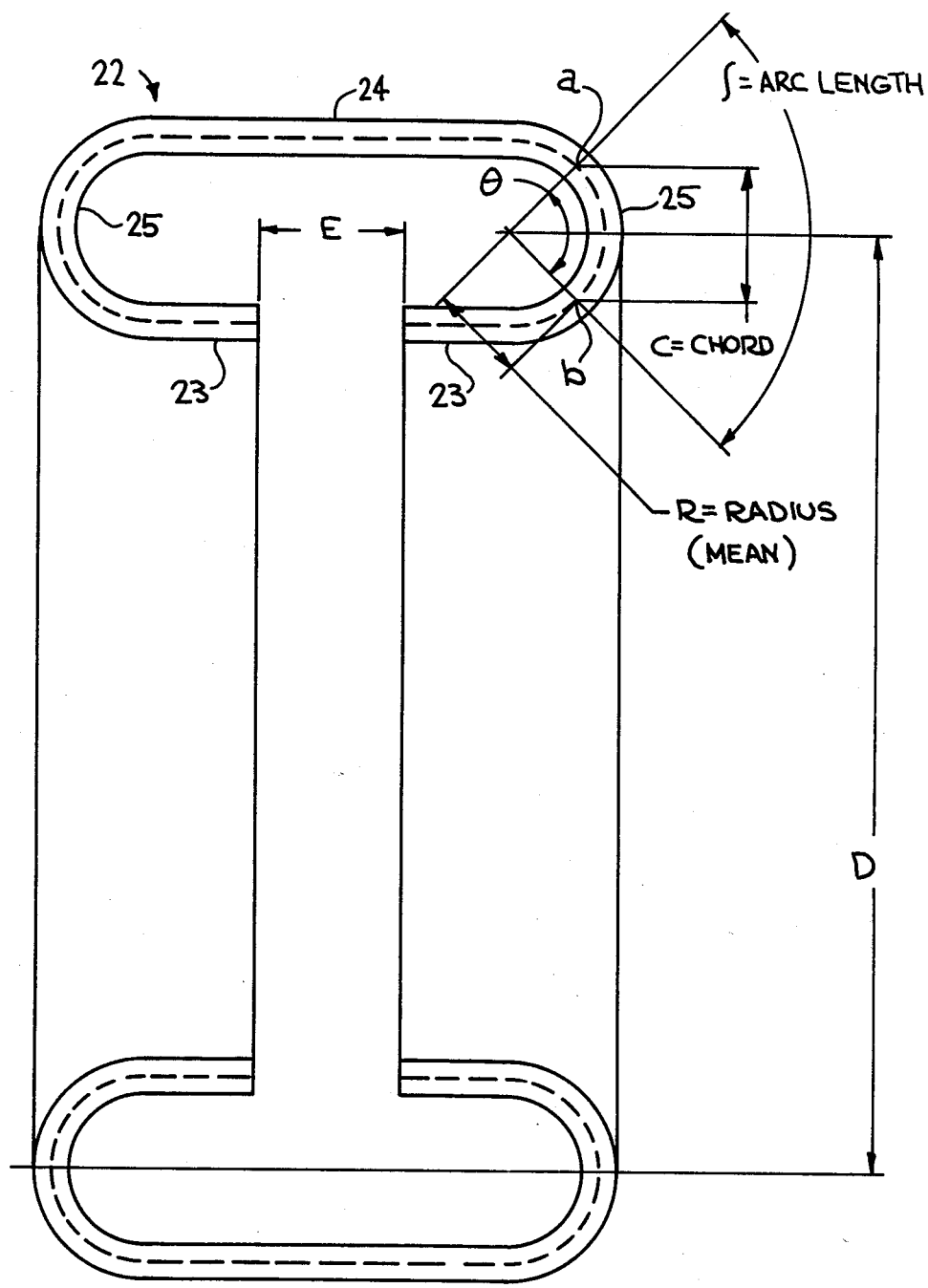
FIG. 6 shows the relationship between the distance for expansion or contraction of the flexible bellows element of this invention.

FIG. 6 shows the relationship between the distance for expansion or contraction and the distance a point in the material moves during such expansion or contraction of the rolling cuff or flexible element of the flexible connector assembly, such as illustrated in FIGS. 5a–5c, and similar reference numerals are applied. As shown in FIG. 6 the distance for expansion or contraction of the torus-shaped rolling cuff or flexible element 22 is shown at E and the distance a point in the material moves is represented, such as by point a to point b, during contraction, or the reverse from point b to point a during expansion. By limiting the amount of movement or change of distance E (distance between flat end sections 23) the stresses in the material of the flexible element 22 can be kept low.

The relationship among the arc length l, the angle of revolution theta ($\theta$), and the radius of curvature (r) of curved section 25 of element 22, as shown in FIG. 6, is defined by equation:

$$l = 0.017453 \times r \times \theta.$$

As can also be seen in FIG. 6, the length of the chord c (distance from point a to point b) is defined by the number of degrees in the angle theta ($\theta$), utilizing the formula:

$$c(\theta) = d \sin(\theta/2),$$

where d = diameter of curved section (elements 25). For example, in the embodiment shown in FIG. 6, the angle of revolution $\theta = 60°$, and the radius of curvature r = 0.125 inches, and thus the arc length l = 0.130 inch, with the length of chord c (distance from point a to point b) = 0.108 inch. The angle $\theta$ changes proportional to stress on the material of element 22. The following table sets forth the arc length and chord length for different angles $\theta$.

| Arc Length (l) | Chord Length (c) |
|---|---|
| (ARC) = 0.017453 r$\theta°$ | c (Chord) = d SIN $\theta$/2 |
| (90°) = 0.196" | c (90°) = 0.125" |
| (60°) = 0.130" | c (60°) = 0.108" |
| (45°) = 0.098" | c (45°) = 0.088" |
| (30°) = 0.065" | c (30°) = 0.0625" |

The angle theta ($\theta$) is proportional to the stress which is placed on the rolling cuff or flexible element 22 by the members (such as inner annular members 26 or 26') secured to the flat end sections 23 of element 22 as these members are moved, by expansion or contraction of the rigid pipe or other apparatus to which they are connected. The arc length will be the travel distance available for each deflection or "convolution" of each individual connector assembly 20. As is apparent, the more sections there are, the greater total deflection of which the connector assembly 20 is capable. For example, for a connector apparatus comprised of ten sections or flexible assemblies 20, with each assembly having a theta of 30° and an arc length of 0.065 inches, the apparatus has a maximum compression of 0.65 inches.

Figure 7:
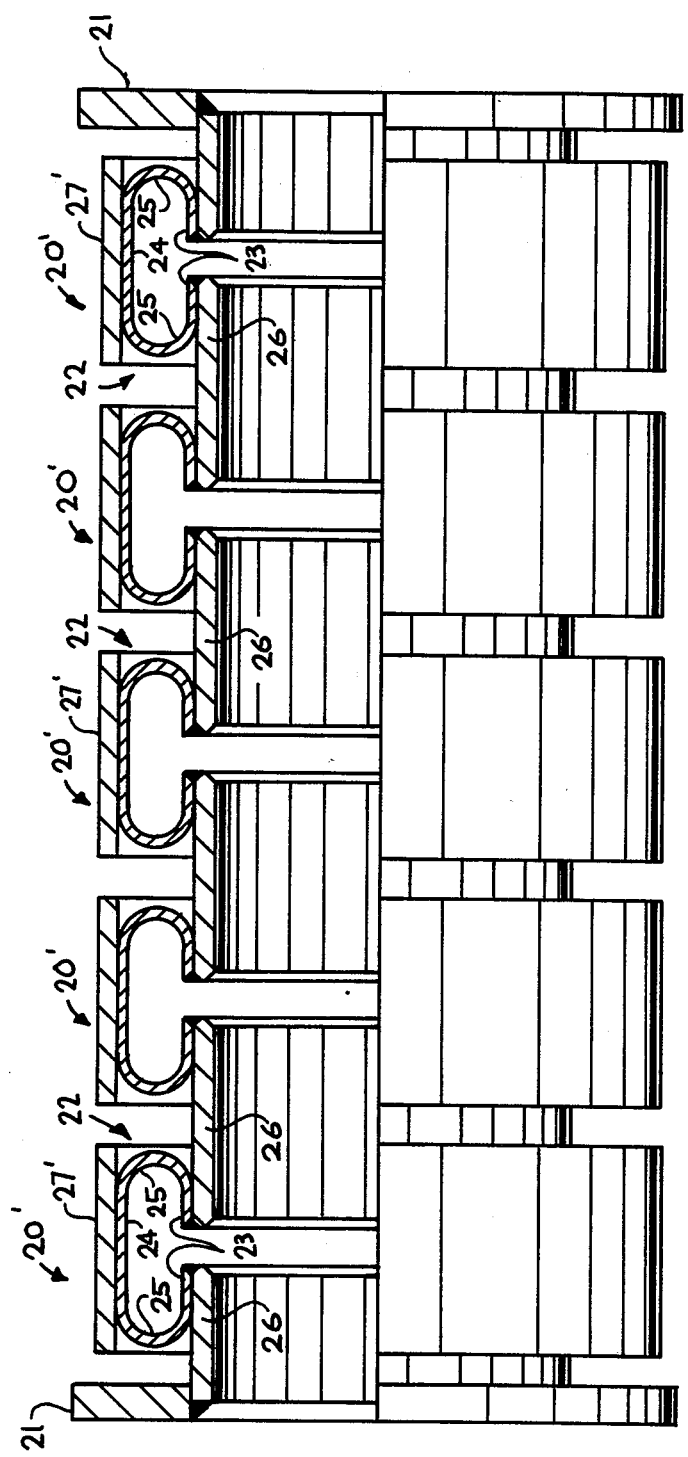
FIG. 7 is an embodiment similar to that of FIG. 3, but utilizing separate back-up members for each flexible bellows element.

FIG. 7 illustrates an embodiment of the invention similar to that of FIG. 3 except a plurality of back-up members or sleeves are utilized instead of a single sleeve. Like references numerals are applied to like components. As shown in FIG. 7, each of the five (5) flexible connector assemblies 20' consist basically of a torus-shaped rolling cuff or flexible element 22, an inner support or connector member 26, and a back-up or support sleeve or ring member 27', inner connector member 26 being secured as by welding, etc. to flat end sections 23 of flexible member 22. As described above, back-up sleeve or member 27' is not fixedly secured to flexible element 22, but is positioned therearound in a tight slip fit. However, the back-up sleeve could be secured to element 22 at the center of the flat body section 24, such as by drilling a hole in the back-up sleeve and spot welding it to element 22 after the sleeve has been slipped over and positioned around the element.

The primary advantage of the FIG. 7 embodiment over that of FIG. 3 is the provision of some flexibility in the overall connector apparatus. By utilizing individual back-up sleeves 27' for each flexible connector assembly 20' instead of a single back-up sleeve 27, as in the FIG. 3 embodiment, it is readily seen that a degree of flexing or bending between the assemblies is provided for in the FIG. 7 embodiment, while still providing the compression and expansion features of the FIG. 3 embodiment. Thus, a connector apparatus of the FIG. 7 embodiment can be effective for applications wherein misalignment of rigid pipes or similar members to which the connector apparatus is attached. While five (5) connector assemblies 20' are illustrated in FIG. 7, the number can be readily changed to accomodate specific applications. Flanges 21 may be provided with appertures for bolting same to associated pipe sections.

Figure 8:
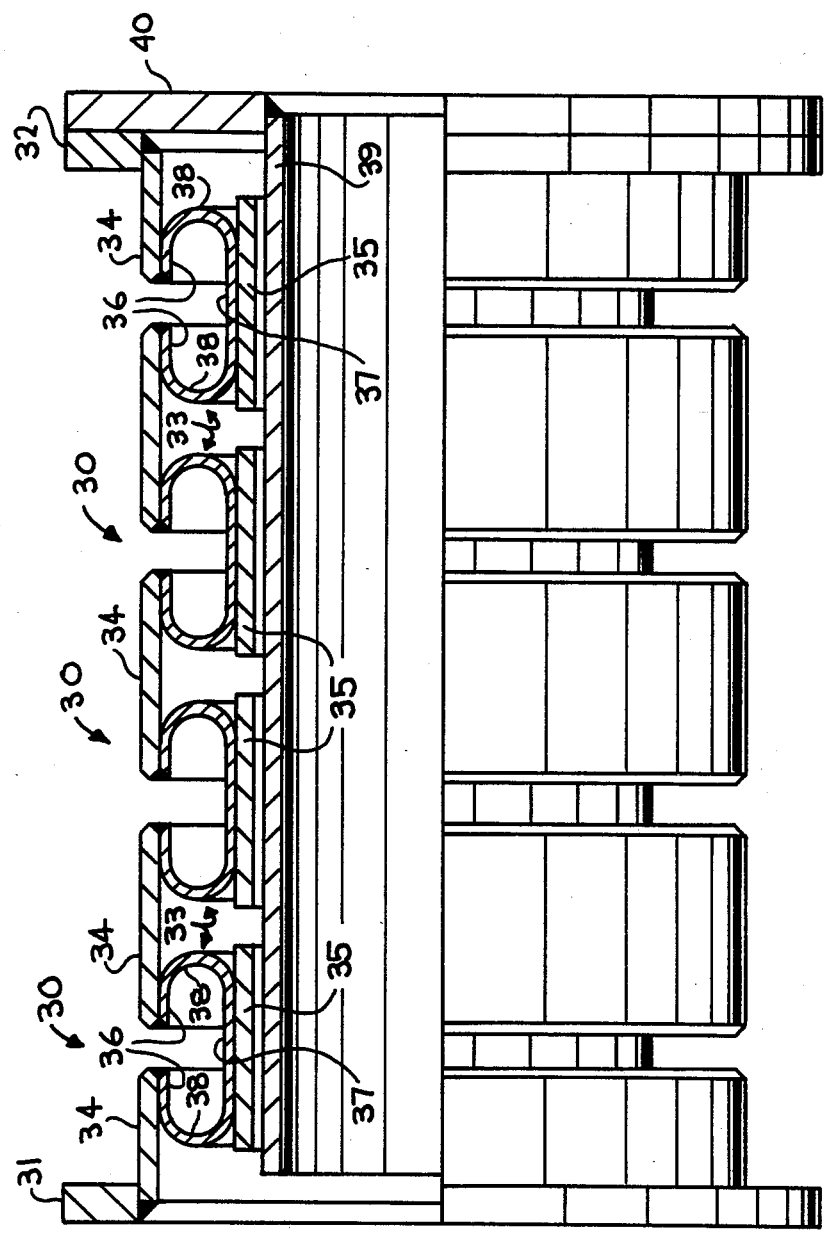
FIG. 8 is an embodiment for use where external pressure is greater than internal pressure.

FIG. 8 illustrates an embodiment of the invention for use where the external pressure is greater then the pressure within the piping system, such as an underseas pipe wherein the water pressure at the burial depth exceeds the pressure of the fluid passing through the piping system.

As shown in FIG. 8, the invention basically consists of a plurality of flexible connector assemblies, as in the FIG. 7 embodiment, but positioned in a reversed location. The flexible connector apparatus of FIG. 8 comprises a plurality (four in this embodiment) of flexible connector assemblies, generally indicated at 30, with the outer two or end assemblies 30 being secured to connector members or flanges 31 and 32. Each of the assemblies 30 consist of a torus-shaped, annular rolling cuff or flexible element 33, having outer annular support members 34, and an inner back-up member or sleeve 35. The flexible element 33 consists of a pair of flat end sections 36, a flat body section 37, and a pair of curved sections 38 interconnecting the flat end sections 36 with the flat body section 37, as in the above-described embodiments. Flat end sections 36 are fixedly secured, as by welding, bonding, etc., to a pair of spaced outer annular support members 34, and back-up member or sleeve 35 is constructed so as to have a tight slip fit with respect to flat body section 37 of flexible element 33. The free ends of the outer two support members 34 are secured, as by welding, etc. to respective flange or connector members 31 and 32.

In view of the reverse positioning of the flexible connector assemblies 30 in the FIG. 8 embodiment, substantial disturbance of the fluid flowing through the connector apparatus would result. Thus, if desired, a fluid turbulance reducing device can be inserted within the back-up sleeves 35, whereby there would be little flow disturbance of the fluid passing therethrough. As shown in FIG. 8, the turbulance reducing device consists of a pipe or tube 39 extending through the back-up sleeves 35 and secured, as by welding, bonding, etc., to a flange or support member 40, which may be attached to flange 32 or positioned between flange 32 and a pipe to which it is to be connected. While not shown, the Flanges 31 and 32 may be provided with opening therearound by which same may be bolted to a corresponding flange of an associated pipe section.

It has thus been shown that the present invention provides a flexible connector apparatus utilizing a rolling cuff bellows which can be used in any piping or hydraulic system requiring a flexible connection of two rigid members. Because the flexible connector apparatus is entirely enclosed, a fluid carried in the pipe line system or hydraulic system cannot escape therefrom or can a fluid be drawn thereinto. The connector apparatus can be utilized for a substantial variety of applications involving expansion, contraction, and flexing of the associated rigid members to which it is attached, while being able to withstand substantially high pressures from within or from without, without undergoing deformation beyond the elastic limit of the rolling cuff bellows thereof.

While particular embodiments of the invention have been illustrated and described, modifications will become apparent to those skilled in the art, and it is intended to cover in the appended claims all such modifications as come within to scope of this invention.

I claim:

1. A flexible connector apparatus for interconnecting substantially rigid members and having at least one flexible assembly, and connector means connected to said flexible assembly adapted for connection with associated rigid members; said flexible assembly comprising:
   a single flexible element having a torus-shaped cross-section defining a space therein and having a pair of spaced substantially flat end sections, a longitudinally extending substantially flat body section, and a pair of curved sections each interconnecting said body section with one of said end sections;
   a pair of spaced members fixedly secured to said spaced substantially flat end sections of said flexible element; and
   a back-up member positioned in contact with said substantially flat body section of said flexible element, said back-up member having a longitudinally extending length greater than said flat body section of said flexible element.

2. The apparatus of claim 1, wherein said single flexible element is of an annular configuration.

3. The apparatus of claim 1, wherein said single flexible element is of an annular configuration, wherein said pair of spaced members are annular in shape, and wherein said back-up member has a ring-like shape.

4. The apparatus of claim 1 wherein said pair of spaced members are positioned radially inwardly of said flexible element, and wherein said back-up member is positioned radially outwardly of said flexible element.

5. The apparatus of claim 1, wherein said single flexible element is of an annular configuration, wherein said pair of spaced members are positioned about an outer surface of said annular flexible element, and wherein said back-up member is positioned within said annular flexible element.

6. The apparatus of claim 1, additionally including a plurality of flexible assemblies connected in a series relation such that a flat end section of one flexible element of one flexible assembly is secured to one of the spaced members to which a flat end section of a flexible element of an adjacent flexible assembly is secured.

7. The apparatus of claim 6, wherein each of said assemblies utilize a common back-up member.

8. The apparatus of claim 6, wherein two of said series connected flexible assemblies are secured to said connector means.

9. The apparatus of claim 8, wherein said connector means are secured to said one of said spaced members of an adjacent flexible assembly.

10. The apparatus of claim 1, wherein said curved sections of said flexible element has an angle of revolution between two points thereon in the range of about 30° to about 90°.

11. The apparatus of claim 10, wherein said angle of revolution is about 60°.

12. The apparatus of claim 1, additionally including fluid flow turbulance reducing means.

13. The apparatus of claim 12, wherein said flexible assembly is of an annular configuration, and wherein said turbulance reducing means extends through an annular opening in said flexible assembly.

14. The apparatus of claim 13, wherein said turbulance reducing means comprises a tube-shaped member extending through said flexible assembly, and a flange-shaped member secured to said tube-shaped member.

15. In a connector apparatus for interconnecting substantially rigid members and having at least one flexible assembly adapted to be connected to said members; the improvement comprising a flexible connector assembly composed of:
 a single flexible element having a torus-shaped cross-section defining a space therein and having a pair of spaced adjacent substantially flat end sections, a longitudinally extending substantially flat body section, and a pair of curved sections each interconnecting said body section with one of said pair of end sections, said end sections being adapted to be secured to associated rigid members; and
 a back-up member positioned in contact with and extending at least along said substantially flat body section of said flexible element;
 whereby only said curved sections of said flexible element undergo unsupported expansion or contraction upon movement of associated rigid members.

16. The improvement of claim 15, wherein said flexible element is of an annular configuration.

17. The improvement of claim 15, additionally including a pair of spaced members fixedly secured to said spaced substantially flat end sections of said flexible element, said spaced members being adapted to be secured to associated rigid members.

18. The improvement of claim 15, wherein said back-up member is positioned radially outwardly of said flexible element.

19. The improvement of claim 15, wherein said back-up member is positioned radially inwardly of said flexible element.

20. The improvement of claim 15, wherein said curved sections of said flexible element each has an angle of revolution between two points thereon in the range of about 30° to about 90°.

* * * * *